F. R. MADDOCK.
ENAMELED RUBBER CLOTH AND PROCESS FOR MAKING THE SAME.
APPLICATION FILED DEC. 31, 1909.
972,553.
Patented Oct. 11, 1910.
Fig. 1.
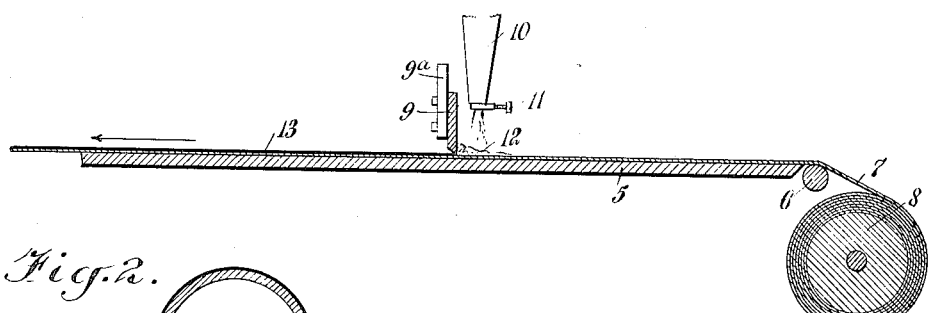
Fig. 2.
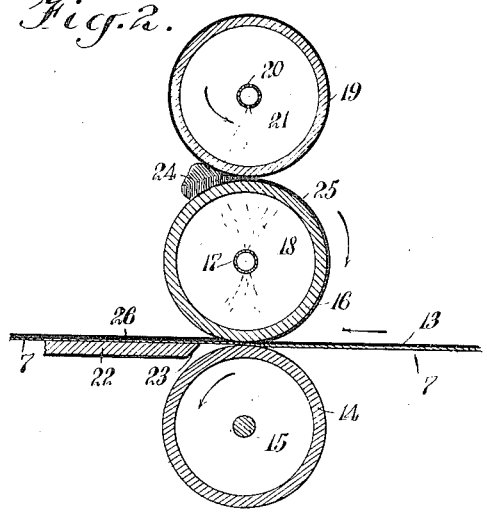
Fig. 3.
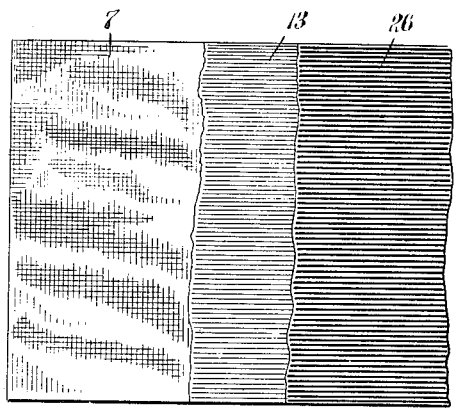
Fig. 4.
WITNESSES
Geo. N. May Co.
Walton Harrison
INVENTOR
Frederick R. Maddock
BY
ATTORNEYS

UNITED STATES PATENT OFFICE.

FREDERICK R. MADDOCK, OF NEWARK, NEW JERSEY.

ENAMELED RUBBER CLOTH AND PROCESS FOR MAKING THE SAME.

972,553.  Specification of Letters Patent.  Patented Oct. 11, 1910.

Application filed December 31, 1909. Serial No. 535,811.

*To all whom it may concern:*

Be it known that I, FREDERICK R. MADDOCK, a citizen of the United States, and a resident of Newark, in the county of Essex and State of New Jersey, have invented a new and Improved Enameled Rubber Cloth and Process for Making the Same, of which the following is a full, clear, and exact description.

My invention relates to enameled rubber cloth, as the term is usually employed in commerce, and to a process for making such cloth.

As is generally understood in this art, many so-called "rubber cloths" are made with the aid of comparatively little pure rubber, most manufacturers using compositions containing, perhaps, small proportions of rubber. This, for my purpose, is immaterial, however, for the reason that the process is equally applicable to pure rubber and to so-called "compositions of rubber"— that is, various rubber-like compositions containing more or less pure rubber.

I have made the discovery that if, before applying the rubber or rubber-like composition to the cloth, the cloth is first coated upon one side with a composition hereinafter described, and this composition dried before the application of the rubber, the adhesion of the rubber to the cloth is greatly increased and the article is thereby greatly improved. I have also made the discovery that the composition in question may with advantage be applied to one face only of the cloth, and that when so applied the rubber-like composition does not stain or discolor the opposite face of the cloth. By virtue of this fact the so-called "grain side" of the finished enameled cloth is rendered free from grease, and is generally of such a character that the cloth may be used in many relations which would otherwise be impracticable. I do not limit myself, however, to the application of the composition to one side only, as in some instances it may be applied to both sides of the cloth.

Briefly speaking, I make up a composition having generally a syrup-like consistency and containing various ingredients, the proportions of which may be varied at will within certain limits. I find it a good plan to use linseed oil boiled to the consistency of a so-called "sweetmeat", in connection with finely divided or powdered china clay and lamp black, together with more or less naphtha or turpentine, as desired. These ingredients may be employed in equal quantities by weight, if preferred, and in some instances the naphtha or turpentine may be omitted. The composition should not be thin enough to spread unduly and yet should not be thick enough to cake. It may be applied in any suitable way. While I do not limit myself to any particular means which may be used for applying the composition, I show one form of simple apparatus which may with advantage be employed for the purpose.

Reference is to be had to the accompanying drawings forming a part of this specification, in which similar characters of reference indicate corresponding parts in all the figures.

Figure 1 is a diagrammatic section showing the application of the composition just described, directly to one face only of the cloth; Fig. 2 is a diagrammatic section indicating further steps of the process, to wit: the application of the rubber-like composition upon the inside of the adhesive composition just described; Fig. 3 is a plan view of a specimen of the enameled cloth, certain portions being removed for the sake of clearness; and Fig. 4 is an enlarged section through a specimen of the cloth, this view indicating the grain, or cloth proper, the layer of adhesive composition upon one face only of the same, and the layer of rubber or rubber-like composition adhering to the layer of adhesive material.

For convenience I will hereinafter refer to the composition of the oil, lamp black, and ingredients directly associated therewith, as an "adhesive composition". I will also refer to the rubber or composition containing the same, as a "rubber-like composition".

Disposed adjacent to a stationary board 5 is a roller 6, and passing over the roller and board is a web 7 of cloth which unwinds from a roll 8. Disposed over the board 5 is a guide 9, the lower edge of which is parallel with the upper surface of the web and close to the same. The guide board 9 is mounted upon a supporting frame 9ª.

At 10 is a receptacle provided with an outlet valve 11, the latter being controllable at will.

At 12 is the adhesive composition which is fed down from the receptacle 10, the supply being controllable at will.

As the web 7 is fed under the guide board 9 and the composition 12 is fed downwardly upon the web and spread out, this composition forms a layer 13 upon the upper surface only of the web, as will be understood from Fig. 1. The unfinished cloth thus treated is now exposed in a drying room and thus thoroughly dried.

At 14 is a roll which is mounted upon a revoluble shaft 15. At 16 is another roll in the center of which is a tubular shaft 17 surrounded by heated air 18. At 19 is another roller mounted upon a heating shaft 20, this shaft being surrounded by heated air 21. The rolls 16, 19 are heating rolls which may, if desired, be of ordinary construction. A board 22 having one of its edges 23 beveled, as shown in Fig. 2, is disposed adjacent to the rolls 14, 16, the upper surface of the board 22 being in alinement with the uppermost surface of the cylinder 14. A mass 24 of rubber or rubber-like composition is placed by hand in engagement with the rolls 16, 19, and by the rotation of these rolls is spread out into a thin film 25 which partakes of the curvature of the roll 16, and at 26 is applied directly upon the film 13 of the dried composition above described. The roller 16 is turned faster than the roller 19, and in doing this it exerts a peculiar stretching and spreading action upon the composition, as the same passes between the rollers 16, 19 and facilitates the distribution of the composition. This completes the operation. The finished article is enameled rubber cloth having great durability and free from blisters. This cloth can be folded or bent abruptly and again straightened without disengaging the two layers of composition from each other or the layer 13 of adhesive material from the web 7. The enameled rubber cloth thus prepared is homogeneous both in its construction and in its action under stresses. It does not shear, peel or blister under ordinary conditions. The finished article, as shown in Fig. 3, consists of three layers of material. First, the web 7, second, a coating 13 of adhesive material (now thoroughly dry), and third, a coating 26 of rubber or rubber-like material.

Having thus described my invention, I claim as new and desire to secure by Letters Patent:

1. The process herein described, of making rubber cloth, which consists in preparing a mixture of linseed oil in its condition known as "sweetmeat," china clay, lamp black and naphtha or turpentine, applying this composition to one face only of a web of cloth, and applying a coating of rubber-like composition upon the first-mentioned coating of composition.

2. As an article of manufacture, the enamel cloth herein described and consisting of a fabric, a coating made of dried linseed oil in its form as sweetmeat, china clay, and lamp black, and a coating of rubber-like composition upon said first-mentioned coating.

In testimony whereof I have signed my name to this specification in the presence of two subscribing witnesses.

FREDERICK R. MADDOCK.

Witnesses:
WALTON HARRISON,
JOHN P. DAVIS.